United States Patent
Hayward et al.

(10) Patent No.: US 10,240,091 B2
(45) Date of Patent: Mar. 26, 2019

(54) PROCESS FOR DEVOLATIZING A FEEDSTOCK

(71) Applicant: D4 Energy Group, Inc., Waysata, MN (US)

(72) Inventors: David Earle Hayward, Morristown, TN (US); Marvin Ronnie Baker, Simpsonville, SC (US)

(73) Assignee: D4 Energy Group, Inc., Waysata, MN (US)

( * ) Notice: Subject to any disclaimer, the term of this patent is extended or adjusted under 35 U.S.C. 154(b) by 178 days.

(21) Appl. No.: 15/428,832

(22) Filed: Feb. 9, 2017

(65) Prior Publication Data

US 2017/0190975 A1    Jul. 6, 2017

Related U.S. Application Data

(63) Continuation of application No. 14/022,303, filed on Sep. 10, 2013, now Pat. No. 9,605,211.
(Continued)

(51) Int. Cl.
*C10B 49/04* (2006.01)
*C10B 49/02* (2006.01)
(Continued)

(52) U.S. Cl.
CPC .............. *C10B 49/04* (2013.01); *B09B 3/00* (2013.01); *B09B 3/0083* (2013.01); *B09B 5/00* (2013.01); *C10B 5/00* (2013.01); *C10B 7/10* (2013.01); *C10B 31/04* (2013.01); *C10B 47/44* (2013.01); *C10B 49/02* (2013.01); *C10B 53/00* (2013.01); *C10B 53/07* (2013.01); *C10B 57/06* (2013.01);
(Continued)

(58) Field of Classification Search
CPC ........ C10B 49/04; F23G 5/0276; F23G 5/444
See application file for complete search history.

(56) References Cited

U.S. PATENT DOCUMENTS

| 4,497,637 A | 2/1985 | Purdy et al. |
| 4,707,248 A | 11/1987 | Silva et al. |

(Continued)

FOREIGN PATENT DOCUMENTS

| WO | WO2009134816 | 11/2009 |
| WO | WO2011107789 | 9/2011 |

OTHER PUBLICATIONS

International Search Report and Written Opinion related to Application No. PCT/US13/58856, dated Sep. 10, 2013, 7 pages.
(Continued)

*Primary Examiner* — Matthew D Krcha
(74) *Attorney, Agent, or Firm* — Jennings, Strouss and Salmon, PLC; Michael K. Kelly; Daniel R. Pote (57) ABSTRACT

Provided herein is a method for devolatizing a solid feedstock. The solid feedstock is treated to a produce a particle size laying between 1 $cm^3$ and 100 $cm^3$. The solid feedstock is passed into a device connected to an outlet of a compaction screw auger comprising an assembly including a solid feedstock injector, a retort, a side arm for injecting a heated gas comprising hydrogen, and a process auger. The solid feedstock is contacted with the heated gas at a temperature of 500° C. to 1000° C. for a time of 60 seconds to 120 seconds, whereby the solid feedstock is converted into a gas stream and a solid stream.

19 Claims, 5 Drawing Sheets

Related U.S. Application Data (60) Provisional application No. 61/699,579, filed on Sep. 11, 2012.

(51) Int. Cl.

| | | |
|---|---|---|
| *B09B 3/00* | (2006.01) | |
| *C10K 1/02* | (2006.01) | |
| *C10B 47/44* | (2006.01) | |
| *C10B 53/00* | (2006.01) | |
| *C10B 53/07* | (2006.01) | |
| *B09B 5/00* | (2006.01) | |
| *C10B 5/00* | (2006.01) | |
| *C10B 7/10* | (2006.01) | |
| *C10B 31/04* | (2006.01) | |
| *C10B 57/06* | (2006.01) | |
| *C10K 1/00* | (2006.01) | |
| *F23G 5/027* | (2006.01) | |
| *F23G 5/033* | (2006.01) | |
| *F23G 5/44* | (2006.01) | |

(52) U.S. Cl.
CPC ............. *C10K 1/004* (2013.01); *C10K 1/026* (2013.01); *F23G 5/0276* (2013.01); *F23G 5/033* (2013.01); *F23G 5/444* (2013.01); *F23G 2201/302* (2013.01); *Y02E 50/12* (2013.01); *Y02P 20/143* (2015.11)

(56) References Cited

U.S. PATENT DOCUMENTS

| | | |
|---|---|---|
| 5,241,825 A | 9/1993 | Collin et al. |
| 5,589,599 A | 12/1996 | McMullen et al. |
| 5,783,046 A | 7/1998 | Flanigan |
| 7,108,767 B2 | 9/2006 | Noto |
| 7,312,371 B2 | 12/2007 | Stell et al. |
| 7,339,087 B2 | 3/2008 | Cruijsberg et al. |
| RE40,419 E | 7/2008 | Norbeck et al. |
| 7,833,512 B2 | 11/2010 | Pulkrabek et al. |
| 7,896,945 B2 | 3/2011 | Sayad-Yaghoubi |
| 8,070,938 B2 | 12/2011 | Stein et al. |
| 8,124,561 B2 | 2/2012 | Bool, III et al. |
| 2005/0032920 A1 | 2/2005 | Norbeck et al. |
| 2009/0054716 A1 | 2/2009 | Baumgartner et al. |
| 2009/0077888 A1 | 3/2009 | Zander et al. |
| 2010/0133085 A1* | 6/2010 | Hutchins ............... C10B 1/10 201/3 |
| 2010/0179057 A1 | 7/2010 | Bool, III et al. |
| 2010/0251616 A1 | 10/2010 | Paoluccio et al. |
| 2011/0008227 A1 | 1/2011 | Sceats et al. |
| 2011/0036751 A1 | 2/2011 | Stein et al. |
| 2011/0265489 A1 | 11/2011 | Graham |
| 2012/0091395 A1 | 4/2012 | Tetzlaff |
| 2012/0121468 A1 | 5/2012 | Tsangaris et al. |

OTHER PUBLICATIONS

Office Action related to U.S. Appl. No. 14/022,303, dated Feb. 11, 2016, 8 pages.

\* cited by examiner

PROCESS FOR DEVOLATIZING A FEEDSTOCK

RELATED APPLICATIONS

This application is a continuation of U.S. Ser. No. 14/022,303, entitled "Process and Device for Devolatizing Feedstock," filed Sep. 10, 2013, which is a non-provisional application claiming the benefit of priority of U.S. Provisional Patent Application No. 61/699,579, filed Sep. 11, 2012, the teachings and contents of which are incorporated herein by reference.

FIELD OF THE INVENTION

The present disclosure generally relates to a process and device for devolatizing a feedstock, in particular to a process and device for pyrolyzing or hydropyrolyzing a solid feedstock derived from one or more waste materials.

BACKGROUND OF THE INVENTION

Pyrolysis refers to thermochemical decomposition of a solid feedstock, such as solid waste. Pyrolysis occurs at elevated temperatures without the participation of oxygen. This decomposition is accompanied by devolatization; that is, the escape of volatile gases from the solid feedstock. Hydropyrolysis is a type of pyrolysis that occurs in a hydrogen-rich atmosphere. Both pyrolysis in general and hydropyrolysis in particular are important processes in waste-to-energy (WTE) conversion. Furthermore, pyrolytic processes typically generate two output streams: a gas stream and a solid stream Most WTE systems are through-systems, where waste is combined with fuel as required and then burned. For example, in a typical 50 megawatt (MW) incinerator plant, approximately 5,000 tons of waste may be burnt per day. Unfortunately, about 50% to about 60% of the waste processed is transformed into incompletely burned bottom ash, which has to be sent to a landfill. Additionally, fly ash is produced, which is classified as hazardous waste and must be processed as such. Burning raw municipal solid waste (MSW) also creates heavy metal emissions, especially from burning plastics, aluminum and batteries contained in a general unsorted waste stream. An expensive and complex off-gas treatment installation is necessary to reduce these emissions to levels required to meet environmental and other regulations. Also, if the MSW is wet, it generally costs more in energy to burn the waste than the actual amount of energy produced from the waste.

Moreover, typical pyrolytic processes only use indirect heating to create pyrolytic conditions, but having enough heat transfer from the pyrolytic device to the feedstock poses numerous operational issues. To overcome these limitations, longer travel paths for the feedstock have been implemented. Increased travel paths, however, increase the time of conversion and device size. As a result, process efficiency and device portability are diminished. The process takes longer and requires greater energy input. Thus, these pyrolytic processes have gas emissions which are unacceptable for current standards in many jurisdictions, are needlessly bulky and inefficient.

SUMMARY OF THE INVENTION

Provided herein is a method for devolatizing a solid feedstock, comprising carbon-based waste selected from the group consisting of hazardous material, biomass, animal manure, tires, municipal solid waste and refuse derived fuel. The method comprises treating the solid feedstock to a produce a particle size laying between 1 $cm^3$ and 100 $cm^3$. The method further comprises passing the solid feedstock into a jacketed system. The next step of the method comprises contacting the solid feedstock with a heated gas, comprising hydrogen, inside the jacketed system at a temperature of about 500° C. to about 1000° C. for a time of about 60 seconds to about 120 seconds, whereby the solid feedstock is converted into a gas stream and a solid stream.

In other embodiments, the present disclosure provides a method of using a heated gas, comprising hydrogen, to pyrolyze a solid feedstock, comprising carbon-based waste selected from the group consisting of hazardous material, biomass, animal manure, tires, municipal solid waste and refuse derived fuel. The method comprises treating the solid feedstock to a produce a particle size laying between 2 $cm^3$ and 3 $cm^3$. The method further comprises passing the solid feedstock into a jacketed system. The next step of the method comprises contacting the solid feedstock with the heated gas inside the jacketed system at a temperature of about 800° C. to about 900° C. and a pressure of about 0.5 atm to about 2 atm for a time of about 60 seconds to about 120 seconds, whereby the solid feedstock is converted to a gas stream and a solid stream.

In yet other embodiments, the present disclosure provides an installation for pyrolyzing a solid feedstock, comprising waste selected from the group consisting of hazardous material, biomass, animal manure, tires, municipal solid waste and refuse derived fuel. The installation comprises a device for reducing particle size, a compaction screw auger, a device for contacting the solid feedstock with a heated gas, comprising hydrogen gas, inside a jacketed system at a temperature of about 500° C. to about 1000° C. for a time of about 60 seconds to about 120 seconds, whereby the solid feedstock is converted into a gas stream and a solid stream, a gas storage bladder to receive the gas stream and a receiver to receive the solid stream.

In some embodiments, the present disclosure provides, a method for devolatizing a solid feedstock, comprising carbon-based waste selected from the group consisting of hazardous material, biomass, animal manure, tires, municipal solid waste and refuse derived fuel, wherein the method comprises: contacting the solid feedstock with a heated gas, comprising hydrogen at a temperature of about 500° C. to about 1000° C., injected into a jacketed system, whereby the solid feedstock is converted into a gas stream and a solid stream.

In some other embodiments, the present disclosure provides a device for devolatizing a solid feedstock, comprising carbon-based waste selected from the group consisting of hazardous material, biomass, animal manure, tires, municipal solid waste and refuse derived fuel, wherein the device comprises: a chamber for contacting the solid feedstock with a heated gas, comprising hydrogen at a temperature of about 500° C. to about 1000° C.; and an injector for injecting the heated gas into the chamber; whereby the solid feedstock is converted into a gas stream and a solid stream.

In yet other embodiments, the present disclosure provides a mixture, comprising: a heated gas, comprising hydrogen at a temperature of about 500° C. to about 1000° C.; and a solid feedstock, comprising carbon-based waste selected from the group consisting of hazardous material, biomass, animal manure, tires, municipal solid waste and refuse derived fuel, wherein the solid feedstock has an average water content of about 10 wt. % to about 15 wt. %.

Other features and iterations of the disclosure are described in more detail below.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION OF THE INVENTION

The present disclosure provides a method and device for injecting a heated gas into the devolatization zone of a process retort, wherein the gas comprises varying amounts of hydrogen. By injecting the heated gas into this zone, additional energy is added to the devolatization process and a higher percentage of methane is formed in the output gas stream than in conventional devolatization systems. Unlike typical pyrolytic processes, the disclosed method allows pyrolysis of the feedstock through direct heating with heated gas, providing a relatively compact and efficient process. Thus, these systems offer advantageous modularity, scalability, portability, and quick installation, with lower operating costs and higher efficiency over previous systems.

(I) Devolatization Unit and Installation

The devolatization system may be used to reduce the amount MSW. Due to the rising costs and environmental impacts of landfills for MSW, municipalities are increasingly looking for other solutions for their waste disposal needs. The systems provided herein take a costly expense and turn it into a revenue source by using the MSW as a carbon-based feedstock to generate clean energy. Also, globally, agricultural waste is a major environmental concern, and may be expensive to transport and dispose. Having a modular unit near the site of agricultural waste generation would avoid transportation of this waste and provide energy to the local area. A system provided herein provides a solution for these concerns and produces energy that can be resold or utilized to fuel the agricultural enterprise. Moreover, manufacturers with a high level of carbon-based manufacturing waste or significant energy needs may use a system described herein to cut both their waste disposal, transportation and energy costs.

A single devolatization unit according to the present disclosure typically produces a net output of about 1 to about 2 MW of power, for example approximately 1.25 MW of power based on a normal mixture of waste from both urban and suburban households. For example to produce 5 MW, four individual devolatization units are required (4 units× 1.25 MW=5 MW). Total energy output may be determined by multiplying power output by the amount of time it has been producing this power. For example, if 5 MW outputs used for 24 hours/day, then the total is 120 MWh of energy in a day (24 h×5 MW=120 MWh/day).

An individual devolatization unit may process from about 5 tons to about 50 tons of solid feedstock per day, for example, from about 10 tons to about 40 tons, from about 20 tons to about 30 tons, from about 5 tons to about 10 tons, from about 10 tons to about 15 tons, from about 15 tons to about 20 tons, from about 20 tons to about 25 tons, from about 25 tons to about 30 tons, from about 30 tons to about 35 tons, from about 35 tons to about 40 tons, from about 40 tons to about 45 tons, or from about 45 tons to about 50 tons.

Total installation size may be about 0.5 hectares (about 5,000 $m^2$), including a feedstock segregation and preparation hall, temporary storage for disqualified elements, miscellaneous space for plumbing and gas manifolds, office space, vehicle storage, etc. The technological part of the installation requires about 180 $m^2$, including final feedstock preparation, devolatization unit, receiving and cooling the syngas and carbon, and the generator set. Under the installation, an about 20-cm thick concrete floor is recommended.

In reference to the devolatization unit, "mobile" means that the system can be dismantled, moved to a different location, and be operational within about 30 days, for example within about 25 days, within about 20 days, within about 15 days or within about 10 days. The devolatization unit may be skid-mounted so it can be moved with a tractor/trailer.

A biological air filtration system may be installed to change the air frequently, for example about every 10 minutes, collecting moisture and eliminating odors, thereby allowing for comfortable and clean air. Dust, odor, and debris emissions may be minimized in the process facility by maintaining a negative air pressure in the entire waste receiving and processing area. Fresh air may be continuously introduced.

(II) Feedstock

Solid feedstock for the process may be any carbonaceous material, including, but are not limited to, any waste materials, coal, heavy oils, biomass and agricultural wastes. Waste materials include, but are not limited to, automotive shredder residue, municipal solid waste (MSW), tire derived fuel (TDF), animal manure (rendered plant remains), nuts (including hulls and shells), coconut shells, seeds (e.g., corn, rice), wood, treated wood waste, fibers, compost, paper, plastic, spent activated carbon, carpet, packing wastes, yard waste, demolition debris, roofing materials, resins, contaminated soils, spent foundry sand, spent absorbents, sewage grit, and crop residues. Wood may be selected from the group consisting of bark, chips, sawdust, plywood, particle board, pallets, skids, bush, tree branches, and yard waste. Fibers may be selected from the group consisting of corrugated cardboard, newspaper, packaging, box board, aseptic board, and pulp sludge.

MSW may contain a wide variety of waste or discarded material. For instance, the waste may include biodegradable waste, non-biodegradable waste, ferrous materials, non-ferrous metals, paper or cardboard in various forms, plastic (some of which may contain trace toxic metals that were used as catalysts, stabilizers or other additives), paints, varnishes and solvents, fabrics, wood products, glass, chemicals including medicines, pesticides and the like, solid waste of various types and a wide range of other materials. The waste includes household waste and industrial waste, the latter being so-called "safe" industrial waste; that is, low in toxic or hazardous materials. Raw MSW typically has a fuel value of approximately 2,500 BTU per pound (5,800 kJ/kg). Processed (dried) municipal solid waste typically has a fuel value of approximately 4,000 BTU per pound (9,300 kJ/kg) to approximately 7,000 BTU per pound (16,300 kJ/kg).

Tire-derived fuel (TDF) is composed of shredded tires. Tires may be mixed with coal or other fuels, such as wood, to be burned in concrete kilns, power plants, or paper mills. TDF is usually consumed in the form of shredded or chipped material with most of the metal wire from the tire's steel belts removed. This fuel has very high energy content, with an average heat value of about 15,500 BTU per pound (36,000 kJ/kg), which is roughly the same average heat value as heavy petroleum fuel oils. Fuel begins to burn at about 550° F. (290° C.) to about 650° F. (340° C.). Complete combustion is achieved with flame temperatures of about 1,200° F. (650° C.). Environmental concerns about this fuel focus on the chemical contents of the tire other than hydrocarbons. Ash may contain a large mass percentage of iron, along with zinc, chromium, cadmium and lead. Calcium may be present in significant quantity. Fluorine, chlorine, sulfur, and nitrogen may comprise the bulk of the non-metal content of the ash.

Refuse-derived fuel (RDF) or solid/specified recovered fuel (SRF) is a fuel produced by shredding and dehydrating MSW. RDF consists largely of combustible components of municipal waste such as plastics and biodegradable waste. RDF processing facilities are normally located near a source of MSW and, while an optional combustion or devolatization facility may be close to the processing facility, it may also be at a remote location. Production of RDF may involve the following steps: preliminary liberation, size screening, magnetic separation, coarse shredding, and refining separation. The residual material may be sold in its processed form or it may be compressed into pellets, bricks or logs and used for other purposes either stand-alone or in a recursive recycling process. Advanced RDF processing methods, for example pressurized steam treatment in an autoclave, may remove or significantly reduce harmful pollutants and heavy metals.

The contamination level of solid feedstock depends on its origin. Assuming normal suburban landfill material without toxic waste, solid feedstock is relatively clean and inert. Therefore, the material may be sent to a landfill without further processing. For heavy metal or other inorganic impurities, the material may be sequestered or post-processed to both purify the resulting carbon and inorganic compounds, which may have commercial value. Alternatively, if the concentration of inorganic compounds is sufficiently low or benign, MSW containing the impurities may be mixed with other MSW to lower the concentration of inorganic impurities to acceptable levels. Any strategy depends on the impurity, the concentration in the MSW and the available facilities.

(III) Method and Device for Pyrolyzing a Solid Feedstock

The process for pyrolyzing a solid feedstock comprises three main phases: feedstock preparation, devolatization, and products and energy generation. These phases may be performed at separate locations and need not occur in tandem. In an exemplary embodiment, devolatization occurs within the same installation as feedstock preparation and products and energy generation.

(a) Phase 1—Feedstock Preparation

If the feedstock is not already in a suitable condition for devolatization (e.g., having suitable water content, particle size, substantially free of metal and non-fuel materials), it must be conditioned before devolatization. Generally, feedstock preparation may be characterized as conversion of MSW into RDF.

The MSW passes over a segregation transmission belt. Hazardous waste is separated and, optionally, recyclable products may be separated and sent to a recycling plant. The sorting system may maximize manual labor, be completely automated, or be a combination of manual labor and automation. For example, sorting systems may be fabricated with heavy steel pans and conveyor belts and equipped with productivity-enhanced features such as interval switches, variable speed self-cleaning sorting belts, overload disconnects, and electronic eyes. The system may be fully interlocked with programmable logic controllers (PLC) to control all the safety devices such as photo-cells, limit switches and flow switches. The PLCs can be set up to control the start up and shut down sequences. The whole system can be tied into a distributed control system (DCS) and controlled by a main computer.

To obtain shredded tires, tires may be split and baled to remove all water and debris from the tires. The tires may then shredded using methods under ambient or cryogenic conditions. The shredded tires typically consist of sharply cut chips, averaging less than 2.5 cm×2.5 cm in size. The steel reinforcing used in tires may or may not be removed.

Following sorting and segregation of the solid feedstock, the remaining material may be passed over a transportation system to a comminuting device, such as a grinder, mill, shredder, or combinations thereof. In some embodiments, the transportation system may comprise a transportation belt or conveyor belt consists of two or more pulleys, with a continuous loop of material that rotates about them. In this case, one or both of the pulleys are powered, moving the belt and the material on the belt forward. In other embodiments, the solid feedstock may be transported using dense phase air transport.

The grinder/mill comminutes the solid feedstock by grinding, milling and/or shredding the solid feedstock, resulting in a size of about 1 $cm^3$ to about 100 $cm^3$, for example about 5 $cm^3$ to about 75 $cm^3$, about 10 $cm^3$ to about 50 $cm^3$, about 1 $cm^3$ to about 10 $cm^3$, about 10 $cm^3$ to about 20 $cm^3$, about 20 $cm^3$ to about 30 $cm^3$, about 30 $cm^3$ to about 40 $cm^3$, about 40 $cm^3$ to about 50 $cm^3$, about 50 $cm^3$ to about 60 $cm^3$, about 60 $cm^3$ to about 70 $cm^3$, about 70 $cm^3$ to about 80 $cm^3$, about 80 $cm^3$ to about 90 $cm^3$, or about 90 $cm^3$ to about 100 $cm^3$. In an exemplary embodiment, the solid feedstock is comminuted to a size of about 25 $cm^3$, or particles with dimensions of about 5 cm by about 5 cm by about 1 cm. Other sizes may be selected by altering the specification of the grinder and mill. These ranges are preferred because they allow efficient devolatization of the solid feedstock.

Many devices are suitable for the comminuting process. In some embodiments, the grinder/mill may be a high-torque roller, which shreds the solid feedstock using high-torque low-speed grinding rollers driven with an electric motor and are very quiet, dust-free, and self-feeding. In other embodiments, the grinder/mill may be a drum grinder. Drum grinders comprise mechanisms consisting of a large steel drum powered by a motor, usually by means of a belt. The drum is mounted parallel to the hopper and spins towards the output chute, thus also serving as a feed mechanism. Drum grinders may be digitally controlled, reversible hydraulic feed wheels and muffling systems. Drum chippers may have a material capacity of about 6 inches to about 20 inches (about 15 cm to about 50 cm).

In other embodiments, the grinder/mill may comprise a steel disk with knives mounted on it as the grinding/milling mechanism. Reversible hydraulically powered wheels may draw the material from the hopper towards the disk, which is mounted perpendicularly to the incoming material. As the disk spins, the knives cut the material into chips, which are thrown out the chute by flanges on the drum. A disk grinder may not be as energy-efficient as a drum grinder, but the solid feedstock is typically comminuted to a more uniform shape and size.

Larger grinder/mills may be used for processing larger solid feedstock, for example for processing wood with diameters of about 2 feet (61 cm) to about 6 feet (180 cm). These larger grinder/mills may employ drums, disks or combinations thereof. In some embodiments, the grinder/mill is a tub grinder, which may handle a material diameter of about 8 feet (240 cm) or more, and may use carbide-tipped flail hammers to pulverize the solid feedstock rather than cut it. These grinder/mills may have an about 200 horsepower (150 kW) to an about 1,000 horsepower (750 kW) engine. Optionally, the grinder/mill may be equipped with an anti-jamming feature.

Blades in the grinder/mill may be rectangular in shape and may be about 4 inches (10 cm) to about 1.5 inches (3.8 cm) in width by about 6 inches (15 cm) to about 12 inches (30 cm) in length. Blades may have a thickness from about 1.5 inches (3.8 cm) to about 2 inches (5.1 cm). Blades may be composed of any suitable resilient material, such as metal, for example, a high grade steel and with an optional chromium content of at least about 8% to enhance material hardness. In some embodiments, the blades are tipped with a carbide, such as tungsten carbide or titanium carbide.

Figure 1:
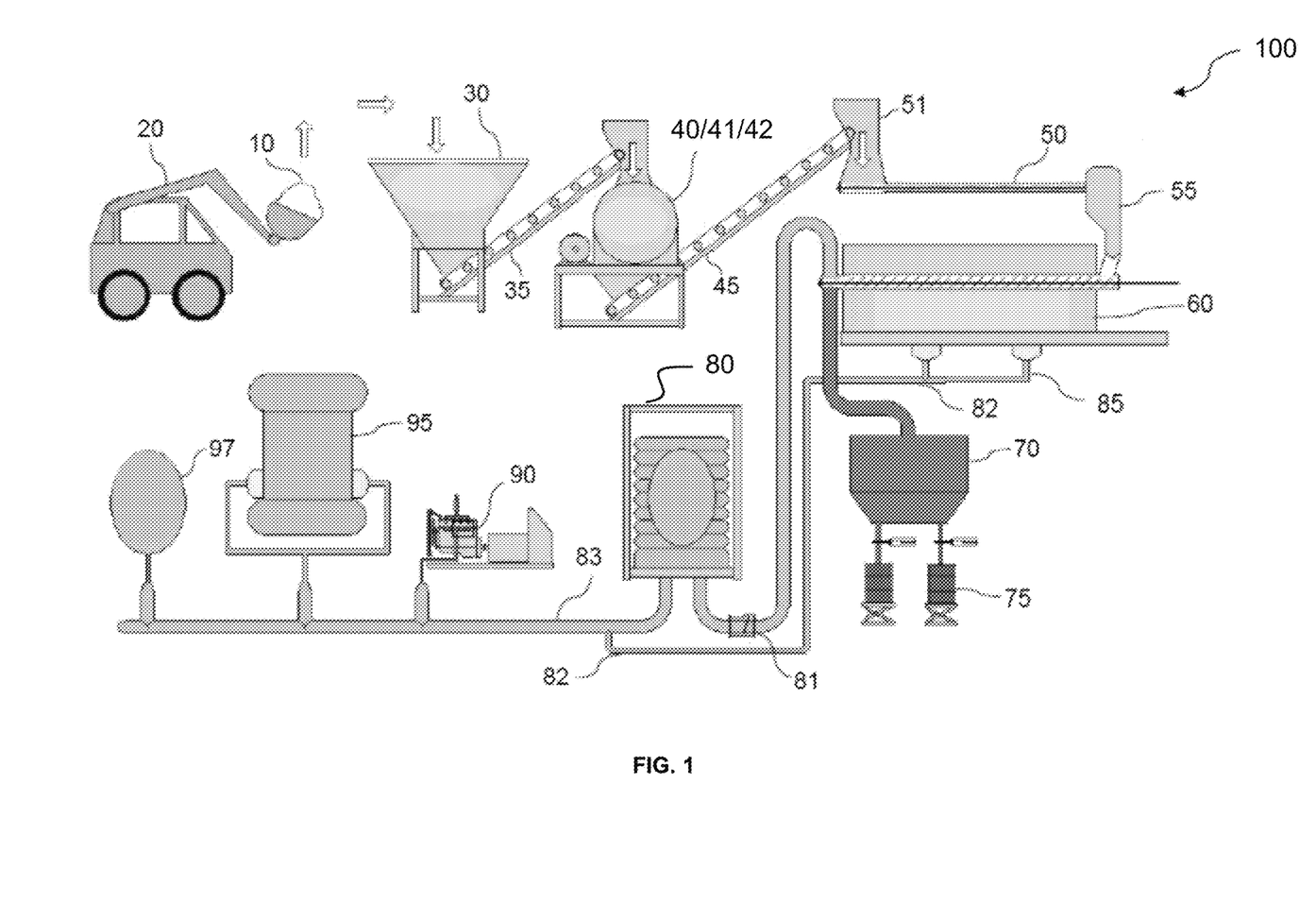
FIG. 1 depicts the process of devolatizing a feedstock, beginning with a conditioned feedstock that is passed through a hammermill, a compaction screw auger, and then through a devolatization unit. Following pyrolysis, the solid stream is separated from the gas stream.

Referring to FIG. 1, the comminuted solid feedstock from the grinder/mill may pass through a ferrous magnetic separator, where any ferrous metals may be separated. The ferrous-free waste passes through non-ferrous magnetic separator 42, where any aluminum or other non-ferrous metals may be separated. The separated ferrous metal may be placed into ferrous metal bin and any non-ferrous metal may be placed into non-ferrous metal bin. The remaining waste may be sent to a drying system 41 and/or hammermill 40 via a conveyor belt for further processing.

In some embodiments, a drying system may be integrated into the installation. The drying system uses heat to reduce the water content for the solid feedstock to a level suitable for devolatization. Water content varies based on the origin of the solid feedstock. If the water content is too high, heat added for devolatization results in drying and not pyrolysis, thus reducing the efficiency of the process. To attain efficient devolatization, the solid feedstock may be, for example, dried to about 1 wt. % to about 15 wt. % of water in the solid feedstock, such as about 5 wt. % to about 15 wt. %, about 10 wt. % to about 15 wt. %, about 1 wt. % to about 2 wt. %, about 2 wt. % to about 3 wt. %. about 3 wt. % to about 6 wt. %, about 3 wt. % to about 4 wt. %, about 4 wt. % to about 5 wt. %, about 5 wt. % to about 6 wt. %, about 6 wt. % to about 7 wt. %, about 7 wt. % to about 8 wt. %, about 8 wt. % to about 9 wt. %, about 9 wt. % to about 10 wt. %, about 10 wt. % to about 11 wt. %, about 11 wt. % to about 12 wt. %, about 12 wt. % to about 13 wt. %, about 13 wt. % to about 14 wt. %, or about 14 wt. % to about 15 wt. %. The drying system may be waste heat from the generator set, industrial boiler, devolatization unit, or other process in the installation to augment heat supplied to the drying system.

(b) Phase 2—Devolatization

Figure 2A:
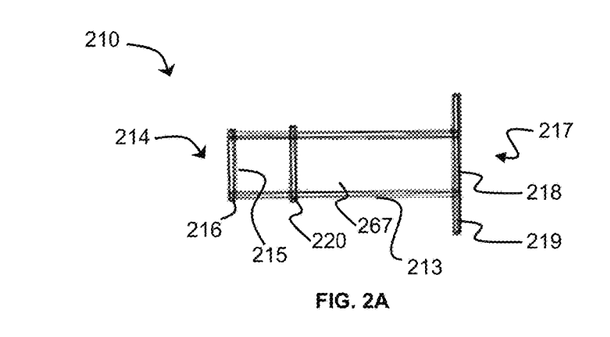
FIG. 2A depicts a cross-sectional side view of injector 210.
Figure 2B:
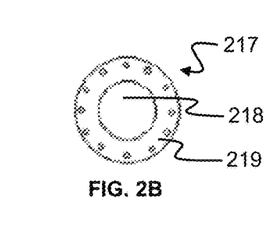
FIG. 2B depicts a view of the inlet end 217 of the injector 210, showing the inlet opening 218 and the injector flange 219 radially disposed around the inlet opening 218.
Figure 2C:
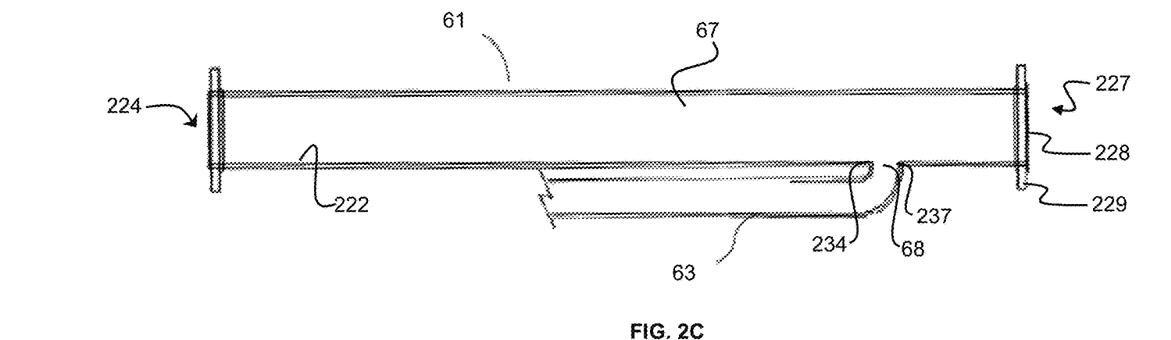
FIG. 2C depicts a cross-sectional side view of retort 61 and a side arm 63.
Figure 2D:
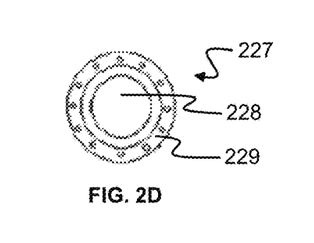
FIG. 2D depicts a view of the retort inlet end 227, showing the retort inlet opening 228 and the first retort flange 229 radially disposed around the retort inlet opening 228.
Figure 2E:
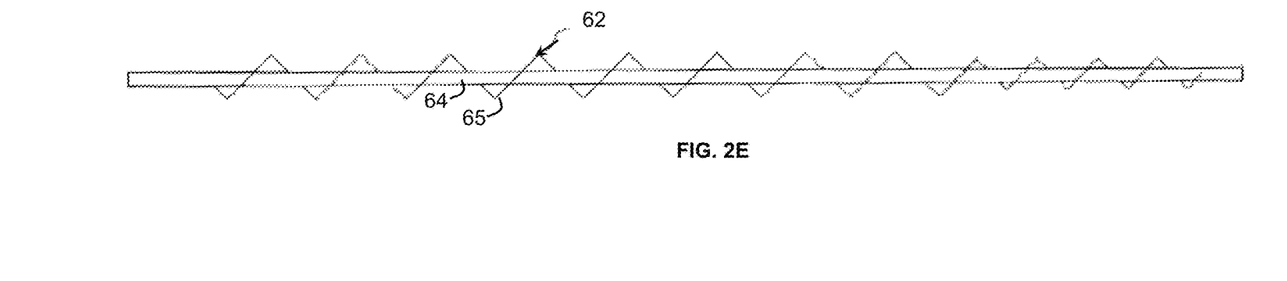
FIG. 2E depicts a side cross-sectional view of an auger 62 having a core 64 and a flight 66.
Figure 2F:
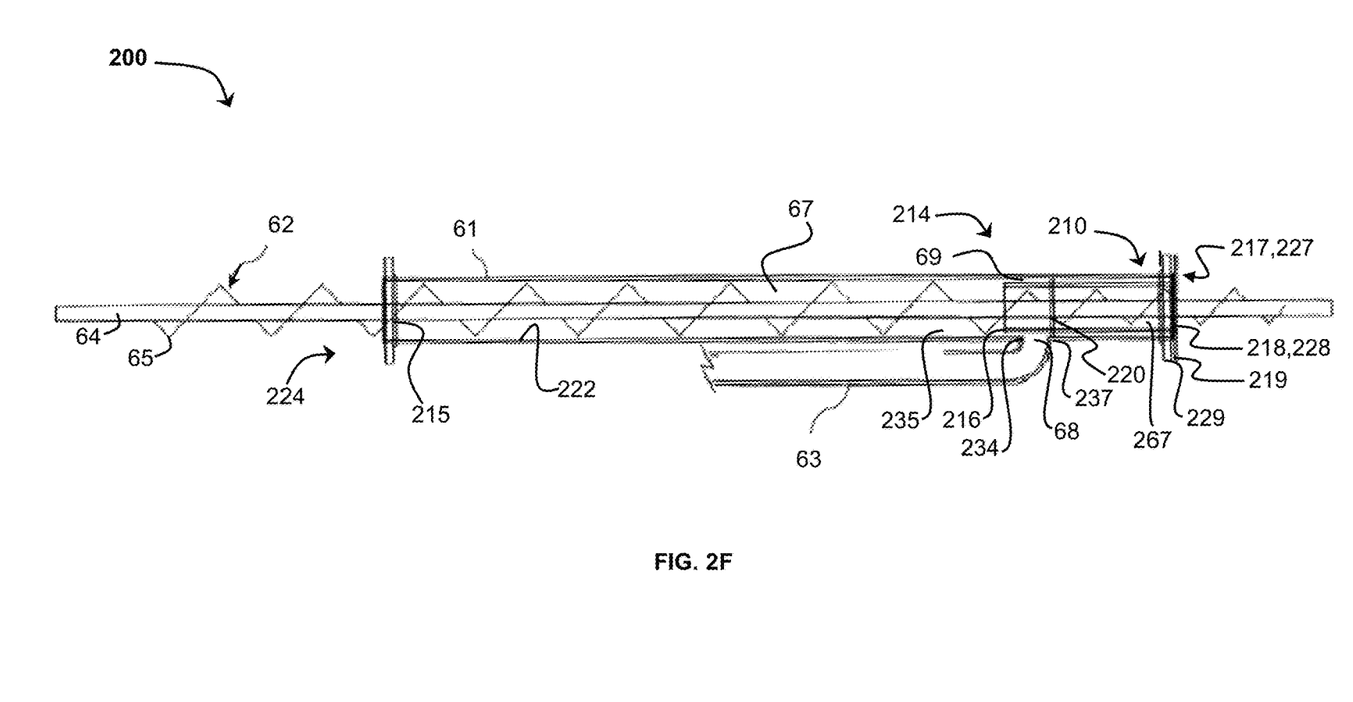
FIG. 2F depicts the assembly 200 includes the retort 61, the auger 62, the injector 210, and the sidearm 63.

After the solid feedstock is conditioned to have a suitable particle size and water content, it is sent through a jacketed system 60 having a devolatization unit. Referring to FIG. 1, the solid feedstock 10 is transported to hopper 30, using, for example, a skid-steer loader 20. Hopper 30 which conveys the feedstock 10 along conveyer 35 to a hammermill 40 or other size reducing technology. Next, feedstock 10 is compacted to a suitable density on an auger 50, for example a compaction screw auger or a vacuum auger. Compaction may also serve in the pre-feed auger 50 to maintain a plug of material to seal off the process from the environment, thereby reducing the oxygen content in the solid feedstock. The compacted feedstock is stored in a bulk feed hopper 55 until it is fed into the jacketed system 60, comprising at least one devolatization unit having a process retort 61. Referring to FIGS. 1 and 2F, the burner system 85 may recirculate output gas into the devolatization zone 235 of the process retort 61.

A hammermill is a machine which further comminutes a solid feedstock by shredding or crushing the solid feedstock into smaller pieces. The hammermill further reduces the average particle size of the solid feedstock to provide a size unification mechanism for the solid feedstock. The hammermill may be a steel drum containing a vertical or horizontal rotating shaft or drum on which hammers are mounted. The hammers may be free to swing on the ends of the rotating shaft, or fixed to the central rotor. The rotor is spun at a high speed inside the drum while the solid feedstock is fed into a feed hopper. The solid feedstock is impacted by the hammer bars and is thereby shredded and expelled through screens in the drum of a selected size. The hammermill may be used as a primary, secondary or tertiary crusher while processing a solid feedstock. In some embodiments, the hammermill is a screenless hammermill, which uses airflow to separate smaller particles of solid feedstock from larger particles. The screenless hammermill may be more reliable, less expensive and more energy efficient than traditional hammermills.

Following processing through a hammermill, the solid feedstock is passed to an auger, such as a compaction screw auger (auger compactor) or a vacuum transportation auger. In a compaction screw auger, a three-dimensional shredding action may significantly reduce volume of the feedstock. In some embodiments, the compaction screw auger may use a single large-pitch compression screw that, unlike the back-and-forth action of ram units, is continually moving forward, reducing processing time and energy costs, and leaving no drag-back residue in the processing chamber. The solid feedstock flows one direction, eliminating spring-back by applying constant pressure against the compacted material in the receiving container. The continuous forward motion of the auger processes waste quickly with no need for hydraulics and with less energy than a ram compactor. The solid feedstock is compacted into pellets of suitable density for devolatization which are conveyed to a jacketed system.

The flow rate through the compactor is about 5 kg to about 30 kg of solid feedstock per minute, such as about 5 kg to about 10 kg per minute, about 10 kg to about 15 kg per minute, about 15 kg to about 20 kg per minute, about 20 kg to about 25 kg per minute, or about 25 kg to about 30 kg per minute. The solid feedstock is moved through the compactor at a pressure of about 0.5 atm to about 3 atm, such as from about 1 atm to about 2 atm. Following compaction, the solid feedstock may have a density equivalent to about 80% of the Modified Proctor scale, for example to about 90% of the Modified Proctor scale, or to about 95% of the Modified Proctor scale. The original Proctor test, ASTM D698/AASHTO T99, uses a 4-inch-diameter (100 mm) mould which holds $1/30^{th}$ cubic foot of solid feedstock and calls for compaction of three separate lifts of solid feedstock using 25 blows by a 5.5 lb hammer falling 12 inches, for a compactive effort of 12,400 ft-lbf/ft$^3$. The "Modified Proctor" test, ASTM D1557/AASHTO T180, uses the same mould as the standard test, but uses a 10 lb. hammer falling through 18 inches, with 25 blows on each of five lifts, for a compactive effort of about 56,000 ft-lbf/ft$^3$.

The jacketed system comprises a devolatization unit. The devolatization unit has an input chamber which receives the feedstock, a conduit for heated gas (e.g., pyrolysis gas or syngas) which mixes with the solid feedstock in the input chamber, and an output chamber where the gas stream is separated from the solid stream. Referring to FIG. 1, heat for pyrolysis is supplied to the jacketed system 60 is supplied directly from a burner system 85 that receives fuel from a gas storage bladder 80 through a check valve 81. The jacketed system also receives heat from the heated gas. Heated gas is also injected into the jacketed system. In some embodiments, the jacketed system further comprises an injector having an injection ring designed to project the heated gas into the devolatization zone. In other embodiments, the retort may be indirectly heated by a series of burners. These same burners may supply the energy to heat the heated gas to be circulated into the retort for the hydropyrolysis portion of the devolatization process.

As the temperature of the solid feedstock increases, pyrolysis takes place. During pyrolysis the feedstock is thermally decomposed to release tars, phenols, and light volatile hydrocarbon gases while the feedstock is converted to char. Depending on the origin of the feedstock, the volatile gases may include water, hydrogen ($H_2$), nitrogen ($N_2$), oxygen ($O_2$), carbon dioxide ($CO_2$), carbon monoxide (CO), methane ($CH_4$), hydrogen sulfide ($H_2S$), ammonia ($NH_3$), propane ($C_2H_6$), and very low levels of unsaturated hydrocarbons such as acetylenes, olefins, aromatics and tars. Once a solid feedstock is converted to a gas stream, undesirable substances such as sulfur compounds and ash may be removed from the gas.

Devolatization is more effective than gasification at least because no combustion releases or forms noxious compounds. Devolatization may be a combination of pyrolysis (devolatization in a non-oxygen atmosphere) and hydropyrolysis (devolatization in a hydrogen-enriched atmosphere). Pyrolysis is the indirect heating of materials where no flame comes into direct contact with the material being processed. Since the reaction takes place is a non-oxygen environment, the volatile part of the material is freed in the form of hydrocarbons that reform into mostly methane.

The ratio of hydrogen to methane in the heated gas may be from about 1:1 to about 1:3, for example about 1:1.5 to about 1:2.5, or about 1:2. In an exemplary embodiment, the ratio of hydrogen to methane in the heated gas is about 1:2. The heated gas may have a hydrogen concentration of about 5% to about 60%, for example, about 5% to about 10%, about 10% to about 20%, about 20% to about 30%, about 30% to about 40%, about 40% to about 50%, or about 50% to about 60%. In an exemplary embodiment, the heated gas has a hydrogen concentration of about 10% to about 45%. In another exemplary embodiment, the heated gas has a hydrogen concentration of about 15% to about 20%. The heated gas may have a pressure of about 0.5 atm to about 5 atm, for example about 0.5 atm to about 2 atm, about 1 atm to about 2 atm, about 2 atm to about 3 atm, about 3 atm to about 4 atm, or about 4 atm to about 5 atm. In an exemplary embodiment, the heated gas has a pressure of about 0.5 atm to about 2 atm. The temperature of the heated gas and the devolatization unit are each about 500° C. to about 1200° C., for example about 600° C. to about 1100° C., from about 700° C. to about 1000° C., from about 800° C. to about 900° C., from about 500° C. to about 800° C., about 500° C. to about 600° C., from about 600° C. to about 700° C., from about 700° C. to about 800° C., from about 900° C. to about 1000° C., from about 1000° C. to about 1100° C., or from about 1100° C. to about 1200° C. In an exemplary embodiment, the temperature of the heated gas is about 850° C. and the temperature of the devolatization unit is about 850° C. The length of the devolatization zone may be about 3 feet to about 24 feet (about 1 meter to about 8 meters), for example about 3 feet to about 6 feet (about 1 meter to about 2 meters), about 6 feet to 9 feet (about 2 meters to about 3 meters), about 9 feet to about 12 feet (about 3 meters to about 4 meters), about 12 feet to about 15 feet (about 4 meters to about 5 meters), about 15 feet to about 18 feet (about 5 meters to about 6 meters), about 18 feet to about 21 feet (about 6 meters to about 7 meters), and about 21 feet to about 24 feet (about 7 meters to about 8 meters). In an exemplary embodiment, the devolatization zone is about 6 feet to about 12 feet (about 2 meters to about 4 meters), or about 9 feet (about 3 meters). The length of path of travel for the solid feedstock through the jacketed system may be about 9 feet to about 90 feet (about 3 meters to about 30 meters), for example about 18 feet to about 63 feet (about 6 meters to about 21 meters), about 27 feet to about 54 feet (about 9 meters to about 18 meters), 9 feet to about 18 feet (about 3 meters to about 6 meters), about 18 feet to about 27 feet (about 6 meters to about 9 meters), about 27 feet to about 36 feet (about 9 meters to about 12 meters), about 36 feet to about 45 feet (about 12 meters to about 15 meters), about 45 feet to about 54 feet (about 15 meters to about 18 meters), about 54 feet to about 63 feet (about 18 meters to about 21 meters), about 63 feet to about 72 feet (about 21 meters to about 24 meters), about 72 feet to about 81 feet (about 24 meters to about 27 meters), or about 81 feet to about 90 feet (about 27 meters to about 30 meters). In an exemplary embodiment, the length of path of travel for the solid feedstock through the jacketed system may be about 45 feet (about 15 meters).

Feedstock entering the system should be permitted time to devolatize completely, for example about 1 second to about 300 seconds, such as about 30 seconds to about 240 seconds, or about 60 seconds to about 120 seconds. Any portion of feedstock must be exposed to sufficient energy input effect pyrolysis or hydropyrolysis. Solid feedstock which is insufficiently comminuted, too large, or is tightly packed may not have sufficient time and exposure to heat to completely devolatize.

In some embodiments, a turbocharging pump doses a predetermined amount of heated gas to the devolatization unit. In an exemplary embodiment, a hydropyrolysis loop is configured with an enhanced blower 77 and auger retort assembly 200. Referring to FIGS. 2A-F, the auger retort assembly 200 comprises an injector 210, a retort 61, and an auger 62. FIG. 2A is a cross-sectional side view of injector 210. The outlet end 214 of the injector 210 has an outlet opening 215 and an injector ring 216 radially disposed around the outlet opening 215 and extending radially outward from the injector 210, and an internal sealing shoulder 220 is disposed on the outer cylindrical surface 213 of the injector 210 between the injector ring 216 and the injector flange 219. Alternatively, the internal sealing shoulder 220 is disposed on the outer cylindrical surface 213 of the injector 210 at a distance $L_1$ from the injector ring 213 and at a distance $L_2$ from the injector flange 219, wherein the distance $L_1$ is less than the distance $L_2$. FIG. 2B is a view of the inlet end 217 of the injector 210, showing the inlet opening 218 and the injector flange 219 radially disposed around the inlet opening 218. The injector 210 has a cylindrical body defined by an inner cylindrical surface and an outer cylindrical surface with a thickness between the inner and outer cylindrical surfaces, an inner cavity, an inside diameter $D_1$, and an outside diameter $D_2$. FIG. 2C is a cross-sectional side view of retort 61 and a side arm 63. The retort 61 has a cylindrical body defined by an inner cylindrical surface and an outer cylindrical surface with a thickness between the inner and outer cylindrical surfaces, an inner cavity, an inside diameter $D_3$, and an outside diameter $D_4$, wherein diameter $D_3$ is greater than diameter $D_2$. The side arm 63 is connected to the retort 61 at an injection point 68 between the outlet end 224 and the inlet end 227 of the retort 61. Alternatively, the side arm 63 is connected to the retort 61 at an injection point 68 at a distance $L_3$ from the retort inlet opening, wherein the distance $L_3$ is greater than the distance $L_2$ but less than the sum of the distances $L_1$ and $L_2$. FIG. 2D is a view of the retort inlet end 227, showing the retort inlet opening 228 and the first retort flange 229 radially disposed around the retort inlet opening 228. FIG. 2E is a side cross-sectional view of an auger 62 having a core 64 and a flight 66. Referring to FIG. 2F, the assembly 200 includes the retort 61, the auger 62, the injector 210, and the sidearm 63. The auger 62 is sized to fit within the inner cavities 67, 267 of the retort 61 and injector 210. When the injector 210 is fully seated into the retort inlet end 227, the injector flange 219 and first retort flange 229 abut. The internal sealing shoulder 220 substantially abuts the inner cylindrical surface 222 of the retort 61 between the inlet region 237 of the injection point 68 and the retort inlet end 228, forming a gap 69. The gap 69 may have a thickness that is the difference between the outside diameter $D_2$ of the injector 210 and the inside diameter $D_3$ of the retort 61. Generally, the gap 69 is configured to mix gases coming through injection point 68 from the side arm 63. The outlet end 214 of the injector 210 extends beyond the outlet region 234 of the injection point 68 of the side arm 63 to define a devolatization zone 235 in the inner cavity 67 of the retort 61 near the injector ring 216. The sidearm 63 recirculates excess heated gas, for example pyrolysis gas enriched with hydrogen which was used in previous iterations of the devolatization process and, optionally, transports product gas back into the retort 61. As a result of the closed-loop system, there are no emissions.

Figure 3:
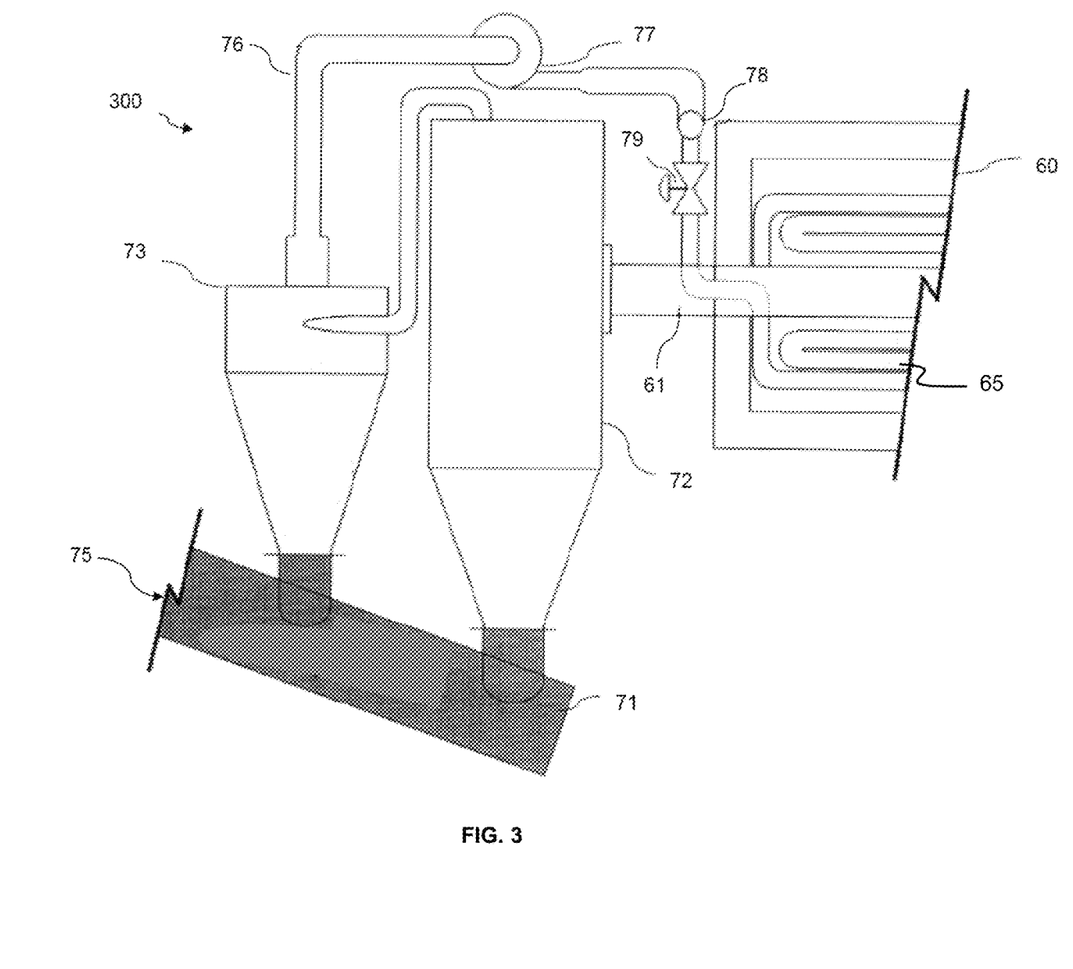
FIG. 3 depicts a gas recirculation system connected to the devolatization unit.

Referring to FIG. 3, the heated gas recirculation system 300 optionally receives the gas stream from the jacketed system 60 which may be sent to a clean-up train 75, comprising a first cyclone 72, a second cyclone 73 and an auger 71. In a particular embodiment, the cyclones 72, 73 separate the solid stream from the gas stream, sending the solid stream into auger 71. In other embodiments, the gas stream may be sent to a deduster, in which lightweight particulate matter are removed in the gas stream.

Figure 4A:
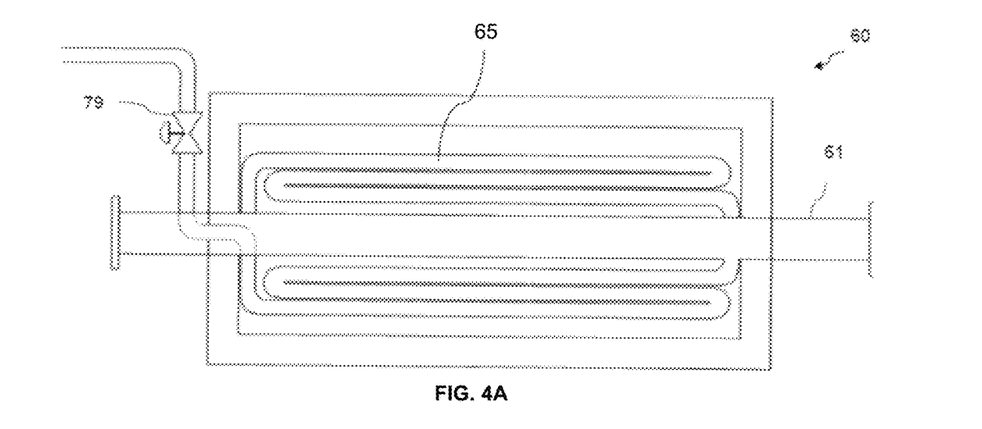
FIG. 4A depicts a jacketed system 60 having a plenum 68 connected a valve 79 and the retort 61.
Figure 4B:
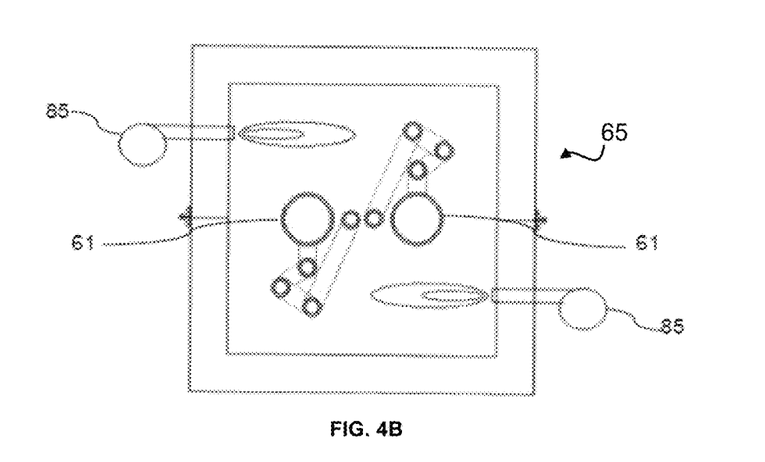
FIG. 4B depicts the plenum 65 in the jacketed system 60 receiving indirect heating from the burner system 85.

Referring to FIGS. 3 and 4, the gas stream may be stored in a gas storage bladder 80 (for example as depicted in FIG. 1). Alternatively, the gas stream may be recirculated from the clean-up train 75 into the jacketed system 60 toward plenum 65 in return pipe 76 using a blower system 77. The flow and pressure of the gas stream into the jacketed system 60 may be controlled with a pressure regulator 78 and a valve 79. The high compression blower 77 may take the gas received from the clean-up train 75 at about 2 psi to about 5 psi and further compresses the clean gas to about 5 psi to about 10 psi. Once the clean compressed gas enters the heated portion of the plenum 65 in the jacketed system 60, the gas is immediately heated to process temperature of the retort 61. In an exemplary embodiment, the gas stream is continually injected into the jacketed system 60 due to the rapid expansion of gas. In some embodiments, the heated gas provides the hydropyrolysis portion of the process, while the indirect heating of the solid feedstock from the burner system 85 provides the pyrolysis portion of the process.

Cyclones 72, 73 operate under the principle of cyclonic separation, a method of removing particulates from a gas stream, without the use of filters, through vortex separation. Rotational effects and gravity are used to separate mixtures of solids and gas. A high speed rotating airflow is established within a cylindrical or conical container referred to as a cyclone. The gas stream flows in a helical pattern, beginning at the top (wide end) of the cyclone and ending at the bottom (narrow) end before exiting the cyclone in a straight stream through the center of the cyclone and out the top. Denser particles in the rotating stream have too much inertia to follow the tight curve of the stream, thus striking the outside wall and falling to the bottom of the cyclone where they may be removed. In a conical system, as the rotating flow moves towards the narrow end of the cyclone, the rotational radius of the stream is reduced, thus separating smaller and smaller particles. The cyclone geometry, together with flow rate, defines the cut point of the cyclone; this is the size of particle that will be removed from the stream with an about 50% efficiency. Particles larger than the cut point are removed with a greater efficiency and smaller particles with a lower efficiency. In some embodiments, a secondary airflow within the cyclone may keep the collected particles from striking the walls, thus protecting the walls from abrasion. The primary air flow containing the particulates enters from the bottom of the cyclone and is forced into spiral rotation by stationary spinner vanes. The secondary air flow enters from the top of the cyclone and moves downward toward the bottom, intercepting the particulate from the primary air. The secondary air flow also allows the collector to optionally be mounted horizontally, because it pushes the particulates toward the collection area, and does not rely solely on gravity to perform this function.

(c) Phase 3—Product Streams and Energy Production

In some embodiments, gas and solid product streams result from the devolatization process. Energy may be generated by combusting the gas stream or the solid stream. Referring again to FIG. 1, the solid stream may be sent to a receiver 70 where the solid stream is further separated from the gas stream, sending the solid stream to containers 75 for secondary uses. The gas stream may pass through a check valve 81 to a storage bladder 80, or it may be recirculated in the jacketed system (for example, as depicted in FIGS. 2-4).

Referring to FIG. 1, from storage bladder 80, the gas stream may be sent along pipe 82 to burner system 85 operatively connected to the jacketed system 60. In burner system 85, the gas stream is combusted to provide thermal energy to the jacketed system for the devolatization process. Alternatively, the gas stream may be moved from storage bladder 80 along pipe 83 to generator set 90, providing fuel of energy generation. In yet other embodiments, the gas stream may be moved from storage bladder 80 along pipe 83 to a process boiler 95 or to another industrial process use 97. Exemplarily, waste heat from generator set 90 of process boiler 95 may be used for drying the solid feedstock earlier in the process, as described above, or may also provide a secondary heat source of the devolatization reaction.

In some embodiments, the devolatization installation comprises an energy and power generation set. Brand and size of the generator set (engine and generator) may be selected based on the needs of the user. Caterpillar and Cummins Power are examples of brands which may produced and supply a generator set.

The solid stream produced from the devolatization of solid feedstock may be cooled and received. In an exemplary embodiment, the solid stream is separated with a cyclone and transported with an auger to a container. The size of the storage container depends on the amount of solid stream produced, which is a function of the composition of the solid feedstock. Following devolatization, the solid stream comprises materials that have a significantly higher concentration of carbon than the solid feedstock, such as coke, char, charcoal, activated carbon, semi-activated carbon, and carbon black. These carbon-rich materials of the solid stream may be used as soil amendments, fuel, filler for rubber, in plastics, or as a filtering aids and additives for road-surfacing materials, and may have varying porosity and surface areas.

In some embodiments, clean grit, long-chain hydrocarbons (oils) or tars may be produced as part of the solid stream. These materials may be collected separately from the carbon-enriched material of the solid stream and may be sold to the chemical and pharmaceutical industries. In some embodiments, long-chain hydrocarbons and tars may be mixed with solid feedstock and recirculated through the devolatization system.

Following devolatization, the solid feedstock produces a gas stream. The gas stream is flammable and may contains a similar distribution of chemicals as natural gas, but with a lower average methane concentration: about 0% to about 20% hydrogen, about 20% to about 70% methane, and about 30% total of nitrogen, ethane, propane, butane, carbon monoxide, and carbon dioxide, optionally with other trace gases. In exemplary embodiments, gas streams with a hydrogen content are recirculated into the jacketed system, providing heated gas that aids in devolatization of the solid feedstock.

In other exemplary embodiments, the gas stream comprises a greater methane content than gas streams produced from conventional devolatization processes. While standard natural gas consists essentially of methane, the gas stream from devolatization of a solid feedstock comprises at least about 20% methane, for example at least about 30% methane, at least about 40% methane, at least about 50% methane, or from about 60% to about 70% methane. In a particular embodiment, the remaining gases in the gas stream are nitrogen and carbon dioxide, which pass through the power generator unburned and unmodified. Like the solid stream, composition of the gas stream is a function of the solid feedstock. In some embodiments, the gas stream includes synthesis gas (syngas), which is a mixture of hydrogen and carbon monoxide. Syngas may be used for power production or used for other industrial purposes.

About 10% to about 15% of the gas stream may be used for energy generation which powers the installation. Optionally, up to about 10% of the gas stream may be reinjected into the devolatization zone of the process retort as a heated gas, advantageously providing thermal energy to aid devolatization of the solid feedstock. The remaining about 85% to about 90% of the gas stream may be cooled and stored in a gas bladder. The gas stream may have a calorific value of about 400 BTU per cubic feet to about 1000 BTU per cubic feet, for example from about 500 BTU per cubic feet to about 900 BTU per cubic feet, from about 600 BTU per cubic feet to about 800 BTU per cubic feet, from about 400 BTU per cubic feet to about 500 BTU per cubic feet, from about 500 BTU per cubic feet to about 600 BTU per cubic feet, from about 600 BTU per cubic feet to about 700 BTU per cubic feet, from about 700 BTU per cubic feet to about 800 BTU per cubic feet, from about 800 BTU per cubic feet to about 900 BTU per cubic feet, or from about 900 BTU per cubic feet to about 1000 BTU per cubic feet. In an exemplary embodiment, the gas stream has a calorific value of about 600 BTU per cubic feet to about 750 BTU per cubic feet. For the sake of comparison, standard natural gas has an average value of about 1000 BTU per cubic feet.

Definitions

"Gasification" generally refers to a process that enables the production of a combustible or synthetic gas (e.g., a gas comprising $H_2$, $CO$, $CO_2$ and $CH_4$) from a carbon-based feedstock, referred to as carbonaceous feedstock or a solid feedstock. The gas may be used to generate electricity or as a basic raw material to produce chemicals and liquid fuels. In particular, the gas may be used for combustion in a boiler for the production of steam for internal processing and/or other external purposes: the generation of electricity through a steam turbine; the combustion directly in a gas turbine or a gas engine for the production of electricity; fuel cells; the production of methanol and other liquid fuels; as a further feedstock for the production of chemicals such as plastics and fertilizers; the extraction of both hydrogen and carbon monoxide as discrete industrial fuel gases; and other industrial heat requirements as required.

Most processes that are either updraft or downdraft gasification systems are considered starved air gasification or starved air combustion. By starving or limiting the air into a thermal combustion, the material is allowed to break down into carbon, oxygen and hydrogen to reform into $CO$ and $H_2$. If too much air is allowed the product, of that combustion consists essentially of $CO_2$ and water with substantially no BTU value. In starved air combustion, $CO$ and $H_2$ form a gas that may be combusted or reformed into syngas. Therefore, since starved air combustion is combustion, only ash remains after the process.

When introducing elements of the present disclosure or the exemplary embodiments(s) thereof, the articles "a", "an", "the" and "said" are intended to mean that there are one or more of the elements. The terms "comprising", "including" and "having" are intended to be inclusive and mean that there may be additional elements other than the listed elements.

Having described the disclosure in detail, it will be apparent that modifications and variations are possible without departing from the scope of the disclosure defined in the appended claims.

Examples

The following example is included to demonstrate embodiments of the disclosure, in particular use of a heated gas to devolatize (pyrolyze and hydropyrolyze) a solid feedstock comprising municipal solid waste (MSW). It should be appreciated by those of skill in the art that the techniques disclosed in the examples represent techniques discovered by the inventors to function well in the practice of the disclosure. Those of skill in the art should, however, in light of the present disclosure, appreciate that many changes may be made in the specific embodiments that are disclosed and still obtain a like or similar result without departing from the spirit and scope of the disclosure, therefore all matter set forth is to be interpreted as illustrative and not in a limiting sense.

MSW was processed to remove non-combustible items. Specifically, non-combustible items such as glass and metals (aluminum, steel, iron and tin) and items that may be recycled were removed mechanically from the MSW on a segregation transmission belt. Next, the sorted MSW was conveyed to a grinder/mill, which comminuted the MSW to an average particle size of about 20 cm$^3$ to about 30 cm$^3$. The comminuted MSW then passed through a dryer system which reduced the average water content to not more than about 15 wt. %. This sorted, comminuted, dried MSW is referred to as refuse derived fuel (RDF).

Referring to FIG. 1, the RDF 10 was transported with a front end loader 20 to a RDF reclaim hopper 30. A conveyer belt 35 transported the RDF 10 to a further reduction process of various means and methods depending on the solid feedstock (for example a hammermill 40), which further comminuted and homogenized the RDF. Next, conveyor belt 45 transported RDF 10 down chute 51 to a compaction screw auger 50, where the RDF 10 was compacted to pellets having a suitable density for devolatization. The compacted RDF was stored in a bulk feed hopper 55 until it was fed into the jacketed system 60, comprising at least one devolatization unit having a process retort. The burner system 85 heated the jacketed system to a temperature of about 500° C. to about 850° C.

A gaseous mixture was prepared from hydrogen and methane, which was substantially free of oxygen and water. The gas was passed through a superheater, which was typically used to form superheated steam, at a pressure of about 0.5 atm to about 2 atm for about 1 minute. The resulting heated gas had a temperature of about 500° C. about 850° C., a pressure of about 1 atm to about 2 atm, and a hydrogen concentration about 10% to about 45%. At least a portion of the heated gas was recirculated from a previous iteration of the devolatization process. One of skill in the art would recognize that temperatures and pressures are generally as described and may be varied depending on the solid feedstock, including percentages and ratios of components in the gaseous mixture.

The heated gas was injected into the devolatization zone of a retort at a pressure of about 0.5 atm to about 2 atm. RDF was fed continuously through the retort using an auger, providing a continuous devolatization process. The RDF resided in the devolatization zone of the retort for about 60 seconds to about 120 seconds, thus contacting the RDF with the heated gas and rapidly heating the RDF. The ratio of RDF to heated gas was about 1 kilogram per liter (kg/L) to about 2 kg/L. Throughout the injecting and feeding processes, the retort may be heated with one or more burners, for example, one burner, two burners, three burners, or four burners. One of skill in the art would also recognize that times of devolatization may depend on the composition of the solid feedstock.

Devolatization in the process retort produced a gas stream and a carbon-enriched material. Referring again to FIG. 1, the carbon-enriched material was sent to a receiver 70 where the material was further separated from the gas stream, sending the solid stream to containers 75 for secondary uses. About 90% of the gas stream passed through a check valve 81 to a storage bladder 80, and about 10% of the gas stream was recirculated into the process retort of the jacketed system 60 (as depicted in FIGS. 2-4). Alternatively, 100% of the gas is sent to the storage bladder. Specifically referring to FIG. 3, the heated gas recirculation system 300 received the gas stream from the jacketed system 60 which was sent to a first cyclone 72 and then a second cyclone 73. The cyclones 72, 73 separated the carbon-enriched material from the gas stream, sending the carbon-enriched material into auger 71. The flow of the gas stream into the jacketed system was controlled at valve 79.

About 85% to about 95% of the RDF was converted to a gas stream and about 20% was converted to a carbon-enriched material, depending on the solid feedstock. About 30 tons of RDF with an average calorific value of at least about 13 GJ/ton produced about 20,400 m$^3$ of a gas stream with a total calorific value of about 24 MJ/m$^3$ (650 BTU per cubic foot) to about 28 MJ/m$^3$ (750 BTU per cubic foot). The finished gas stream comprises about 10% to about 20% hydrogen, about 50% to about 70% methane, and about 30% total of nitrogen, ethane, propane, butane, carbon monoxide and carbon dioxide. About 5% to about 15% of the RDF was converted to elemental carbon with a calorific value of about 28,000 kJ/kg.

The emissions of the burners for the devolatization unit described herein were about 0.01 mg/m$^3$ of particulate matter, 0.002 mg/m$^3$ of sulfur dioxide ($SO_2$), about 0.03 mg/m$^3$ of nitrogen oxides ($NO_x$), about 0.01 mg/m$^3$ of volatile organic compounds (VOCs), about 0.2 mg/m$^3$ of carbon monoxide and about 111 g/m$^3$ of carbon dioxide, with no detectable dioxins or furans. The lack of oxygen and thus the lack of combustion during devolatization is a reason why dioxins and furans were not products of the disclosed process. These emission concentrations are at least two orders of magnitude below the emission concentrations required by the European Union. Emissions were even further minimized by operating the devolatization unit as a closed loop system, as described in the exemplary embodiments.

As demonstrated above, MSW is efficiently devolatized, producing a valuable gas stream and solid stream.

What is claimed is:

1. A method for devolatizing a solid feedstock, comprising carbon-based waste selected from the group consisting of hazardous material, biomass, animal manure, tires, municipal solid waste and refuse derived fuel, wherein the method comprises:
    treating the solid feedstock to a produce a particle size laying between 1 cm$^3$ and 100 cm$^3$;
    passing the solid feedstock into a device connected to an outlet of a compaction screw auger comprising an assembly including a solid feedstock injector, a retort, a side arm for injecting a heated gas comprising hydrogen, and a process auger;

the injector having a cylindrical body defined by an inner cylindrical surface and an outer cylindrical surface with a thickness between the inner and outer cylindrical surfaces, an inner cavity, an inside diameter $D_1$, and an outside diameter $D_2$; an inlet end of the injector having an inlet opening and injector flange radially disposed around the inlet opening and extending radially outward from the cylindrical body of the injector; an outlet end of the injector having an outlet opening and an injector ring radially disposed around the outlet opening and extending radially outward from the cylindrical body of the injector; an internal sealing shoulder being disposed on the outer cylindrical surface of the injector at a distance $L_1$ from the injector ring and at a distance $L_2$ from the injector flange, wherein the distance $L_1$ is less than the distance $L_2$;

the retort having a cylindrical body defined by an inner cylindrical surface and an outer cylindrical surface with a thickness between the inner and outer cylindrical surfaces, an inner cavity, an inside diameter $D_3$, and an outside diameter $D_4$, wherein diameter $D_3$ is greater than diameter $D_2$; an inlet end of the retort having a retort inlet opening and a first retort flange radially disposed around the retort inlet opening and extending radially outward from the cylindrical body of the retort; an outlet end of the retort having a retort outlet opening and a second retort flange radially disposed around the retort outlet opening and extending radially outward from the cylindrical body of the retort;

the side arm connecting to the retort at an injection point between the retort inlet end and the retort outlet end; the injection point having an inlet region toward the retort inlet end and an outlet region toward the retort outlet end;

the process auger transversing the inner cavities of the retort and the injector; the injector flange and first retort flange being abutted; the internal sealing shoulder substantially abutting the inner cylindrical surface of the retort; and the outlet end of the injector extending between the retort outlet end and the outlet region of the injection point to define a devolatization zone in the inner cavity of the retort near the injector ring; and contacting the solid feedstock with the heated gas at a temperature of 500° C. to 1000° C. for a time of 60 seconds to 120 seconds, whereby the solid feedstock is converted into a gas stream and a solid stream.

2. The method of claim 1, further comprising removing non-fuel materials from the solid feedstock.

3. The method of claim 1, further comprising drying the solid feedstock to an average water content of 10 wt. % to 15 wt. %.

4. The method of claim 1, wherein treating the solid feedstock comprises:
removing non-fuel materials from the solid feedstock;
grinding/milling to comminute the solid feedstock; and
drying the solid feedstock to an average water content of 10 wt. % to 15 wt. %.

5. The method of claim 1, wherein the solid feedstock is fed continuously through the retort using the process auger.

6. The method of claim 1, wherein the side arm is connected to the retort at the injection point at a distance $L_3$ from the retort outlet opening, wherein the distance $L_3$ is greater than the distance $L_2$ but less than the sum of the distances $L_1$ and $L_2$.

7. The method of claim 1, wherein the device further comprises a gap defined between the outer cylindrical surface of the injector and the inner cylindrical surface of the retort and between the internal sealing shoulder and the injector ring; the gap having a thickness that is the difference between the outside diameter $D_2$ of the injector and the inside diameter $D_3$ of the retort; and the gap being configured to mix gases coming through the injection point from the side arm.

8. The method of claim 1, wherein the first retort flange is configured to couple to a bulk feed hopper, such that feed stock is received through the inlet opening.

9. The method of claim 1, wherein the heated gas has a temperature of 800° C. to 900° C.

10. The method of claim 1, wherein the method further comprises heating a gas to produce the heated gas at a temperature of 500° C. to 1000° C. and a pressure of 0.5 atm to 2 atm.

11. The method of claim 1, wherein the heated gas further comprises methane.

12. The method of claim 1, wherein the heated gas is substantially free of water and oxygen gas.

13. The method of claim 1, wherein the gas stream comprises hydrogen and carbon monoxide.

14. The method of claim 1, wherein the solid stream is a carbon-enriched material.

15. The method of claim 14, wherein the carbon-enriched material is semi-activated carbon.

16. A method of using a heated gas, comprising hydrogen, to pyrolyze a solid feedstock, comprising carbon-based waste selected from the group consisting of hazardous material, biomass, animal manure, tires, municipal solid waste and refuse derived fuel, wherein the method comprises:

treating the solid feedstock to a produce a particle size laying between 2 $cm^3$ and 3 $cm^3$;

passing the solid feedstock into a device connected to an outlet of a compaction screw auger comprising an assembly including a solid feedstock injector, a retort, a side arm for injecting a heated gas comprising hydrogen, and a process auger;

the injector having a cylindrical body defined by an inner cylindrical surface and an outer cylindrical surface with a thickness between the inner and outer cylindrical surfaces, an inner cavity, an inside diameter $D_1$, and an outside diameter $D_2$; an inlet end of the injector having an inlet opening and injector flange radially disposed around the inlet opening and extending radially outward from the cylindrical body of the injector; an outlet end of the injector having an outlet opening and an injector ring radially disposed around the outlet opening and extending radially outward from the cylindrical body of the injector; an internal sealing shoulder being disposed on the outer cylindrical surface of the injector at a distance $L_1$ from the injector ring and at a distance $L_2$ from the injector flange, wherein the distance $L_1$ is less than the distance $L_2$;

the retort having a cylindrical body defined by an inner cylindrical surface and an outer cylindrical surface with a thickness between the inner and outer cylindrical surfaces, an inner cavity, an inside diameter $D_3$, and an outside diameter $D_4$, wherein diameter $D_3$ is greater than diameter $D_2$; an inlet end of the retort having a retort inlet opening and a first retort flange radially disposed around the retort inlet opening and extending radially outward from the cylindrical body of the retort; an outlet end of the retort having a retort outlet opening and a second retort flange radially disposed around the retort outlet opening and extending radially outward from the cylindrical body of the retort;

the side arm connecting to the retort at an injection point between the retort inlet end and the retort outlet end; the injection point having an inlet region toward the retort inlet end and an outlet region toward the retort outlet end;

the process auger transversing the inner cavities of the retort and the injector; the injector flange and first retort flange being abutted; the internal sealing shoulder substantially abutting the inner cylindrical surface of the retort; and the outlet end of the injector extending between the retort outlet end and the outlet region of the injection point to define a devolatization zone in the inner cavity of the retort near the injector ring; and contacting the solid feedstock with the heated gas at a temperature of 800° C. to 900° C. and a pressure of 0.5 atm to 2 atm for a time of 60 seconds to 120 seconds, whereby the solid feedstock is converted to a gas stream and a solid stream.

17. The method of claim 16, wherein treating the solid feedstock comprises:
removing non-fuel materials from the solid feedstock;
grinding/milling to comminute the solid feedstock; and
drying the solid feedstock to an average water content of 10 wt. % to 15 wt. %.

18. The method of claim 16, wherein the side arm is connected to the retort at the injection point at a distance $L_3$ from the retort outlet opening, wherein the distance $L_3$ is greater than the distance $L_2$ but less than the sum of the distances $L_1$ and $L_2$.

19. The method of claim 16, wherein the device further comprises a gap defined between the outer cylindrical surface of the injector and the inner cylindrical surface of the retort and between the internal sealing shoulder and the injector ring; the gap having a thickness that is the difference between the outside diameter $D_2$ of the injector and the inside diameter $D_3$ of the retort; and the gap being configured to mix gases coming through the injection point from the side arm.

* * * * *